United States Patent
Nanba et al.

(10) Patent No.: US 6,173,232 B1
(45) Date of Patent: Jan. 9, 2001

(54) VEHICLE NAVIGATION SYSTEM AND A RECORDING MEDIUM

(75) Inventors: Akimasa Nanba; Takeshi Yanagikubo, both of Anjo (JP)

(73) Assignee: Aisin AW Co., Ltd., Anjo (JP)

(*) Notice: Under 35 U.S.C. 154(b), the term of this patent shall be extended for 0 days.

(21) Appl. No.: 09/110,837

(22) Filed: Jul. 7, 1998

(30) Foreign Application Priority Data

Jul. 8, 1997 (JP) .................................................. 9-182364

(51) Int. Cl.[7] .................................................. G06F 165/00
(52) U.S. Cl. .................... 701/209; 701/210; 701/214; 701/215; 701/216
(58) Field of Search .................................. 701/201, 207, 701/208, 209, 210, 213, 215, 216, 217

(56) References Cited

U.S. PATENT DOCUMENTS

| | | | |
|---|---|---|---|
| 5,459,667 | * 10/1995 | Odagaki et al. | 364/444 |
| 5,568,390 | * 10/1996 | Hirota et al. | 364/449 |
| 5,821,880 | * 10/1998 | Hirota et al. | 364/449 |
| 5,938,718 | * 10/1998 | Morimoto et al. | 701/201 |
| 5,991,689 | * 11/1999 | Aito et al. | 701/209 |
| 6,002,981 | * 12/1999 | Kreft | 701/210 |
| 6,049,753 | * 4/2000 | Nimura | 701/201 |

FOREIGN PATENT DOCUMENTS

| | | |
|---|---|---|
| 137097 | 5/1990 | (JP) . |
| 2-137096 | 5/1990 | (JP) . |
| 2-137098 | 5/1990 | (JP) . |
| 2-137099 | 5/1990 | (JP) . |
| 2-137100 | 5/1990 | (JP) . |

* cited by examiner

*Primary Examiner*—William A. Cuchlinski, Jr.
*Assistant Examiner*—Marthe Y. Marc-Coleman
(74) *Attorney, Agent, or Firm*—Oliff & Berridge, PLC

(57) ABSTRACT

A navigation system including an information memory device that stores road information for parallel roads and other information required for executing route guidance; a present position detection device that detects a present position of a vehicle by detecting vehicle travel information; and a control device that reads the road information stored in the information memory device on the basis of the present position detected by the present position detection device, and executes matching processing of the present position detection information to the road information to provide route guidance. The control device determines whether parallel roads exist on the basis of the road information stored in the information memory device and, when parallel roads exist, selects the road on which the vehicle is running from the identified parallel roads according to the road information and various indicative or decision parameters. Therefore, the system can perform precise matching of the road travelled of the parallel roads to determine the present position.

19 Claims, 13 Drawing Sheets

FIG. 1A
FIG. 1
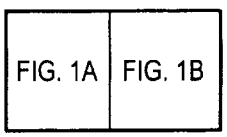
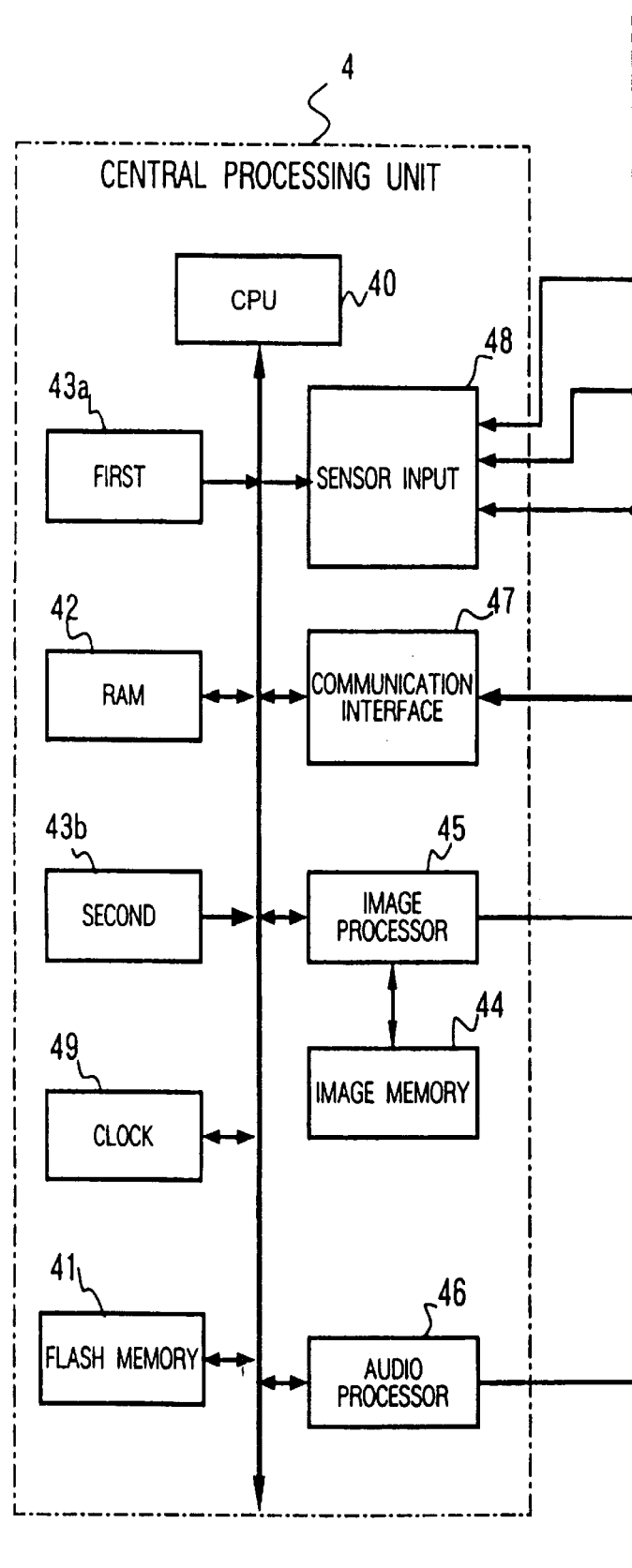

FIG. 3

Intersection data

| Number of intersection (K) | |
|---|---|
| 1 | Intersection number |
| | Intersection name |
| | Traffic signal data |
| | Pedestrians' crossing data |
| | Branch point distinctive object data |
| | Entry road data |
| | Advancing road data |
| | Landmark data |
| ⋮ | ⋮ |
| K | |
| | |
| | |
| | |
| | |
| | |

VEHICLE NAVIGATION SYSTEM AND A RECORDING MEDIUM

BACKGROUND OF THE INVENTION

1. Field of Invention

The invention relates to a vehicle navigation system and a recording medium which executes matching processing of present position detection information to road information, and provides route guidance.

2. Description of Related Art

Since traffic density, especially in the urban areas, has been increasing in recent years and surplus land space has been decreasing, a growing number of newly constructed roads have taken on a multilevel structure. Therefore, the position of a vehicle can be mistakenly identified when a navigation system provides navigation guidance in a case where a plurality of the roads run in parallel. For example, according to the highway recognition system proposed in Japanese Patent Publication No.137096/90, the related art discloses a system which starts to check the time when the system determines the velocity of the running vehicle is higher than a predetermined velocity, and determines the vehicle is running on a highway when the velocity lasts longer than a predetermined time. Further, the system according to the related art detects and cumulates the steering movements when the velocity of the vehicle is higher than the predetermined velocity, and determines whether the vehicle is running on the highway depending on whether the steering angle is larger than the predetermined value. Also the related art discloses a system which determines when the vehicle leaves the highway according to the condition that the velocity decreases as a direction indicator functions and the steering angle is larger than the predetermined value. (See Japanese Patent Publications Nos. 137097/90~137100/90).

The above mentioned related art device determines that the vehicle is running on the highway when the velocity of the vehicle lasts more than the predetermined time, however, according to recent traffic conditions, when the vehicle runs a main road although categorized as an ordinary road, the velocity of the vehicle can be very high depending on a road section. Therefore, the system can't determine simply by the velocity of the vehicle whether the road on which the vehicle is running is a highway. Further, the place where a highway and an ordinary road run in parallel with a two level structure and also the place where two ordinary roads or two highways run in parallel with a two level structure have been increasing. Under these conditions, the prior system can not determine the road on which the vehicle is running by the velocity of the vehicle.

SUMMARY OF THE INVENTION

It is the object of the invention that a precise map matching is executed and a present position is recognized.

The vehicle navigation system according to the invention executes map matching processing of vehicle present position detection information to road information and provides route guidance, comprises information memory means for storing road information on the parallel roads and other information required for executing route guidance; present position detection means for detecting a present position by detecting vehicle travel information; control means for reading road information stored in the information memory means on the basis of the present position detected by the present position detection means, executing matching processing of the present position detection information to the road information, and providing route guidance; wherein the control means determines the road on which the vehicle is running by determining whether the parallel roads exist based on road information stored in the information memory means, by determining whether intersections exist in the vicinity of the present position on the basis of road information stored in the information memory means, when the system determines the vehicle is stopped based on the velocity detected by the present position detection means, by obtaining beacon installation information on the parallel roads from road information stored in the information memory means and determining the types of beacons, or by determining the angles of satellites detected by the present position detection means, and executes matching processing when there exists parallel roads. When the parallel roads exist, the control means determines the road on which the vehicle is running by selecting one of the parallel roads according to the road information of the parallel roads, under the condition the velocity detected by the present position detection means continues during a predetermined distance or time, controlling matching cost, and executing matching processing.

BRIEF DESCRIPTION OF THE DRAWINGS

The invention will be described with reference to the drawings in which:

FIG. 3 is a diagram showing an example of the structure of the intersection data;

DETAILED DESCRIPTION OF PREFERRED EMBODIMENTS

An embodiment of the invention will be described below with reference to the drawings.

Figure 1B:
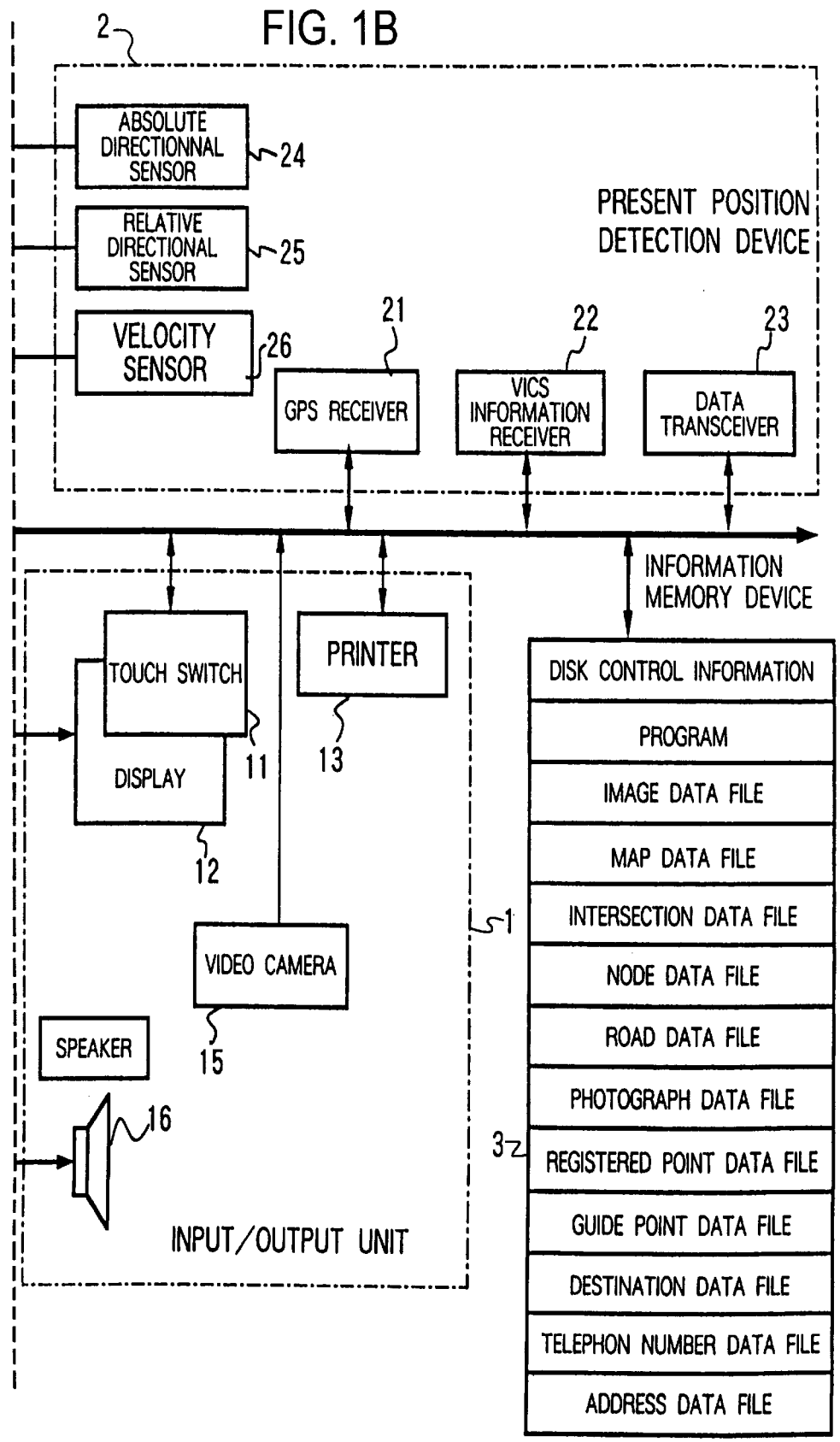
FIG. 1 is a diagram showing an embodiment of the vehicle navigation system according to the invention.
Figure 2:
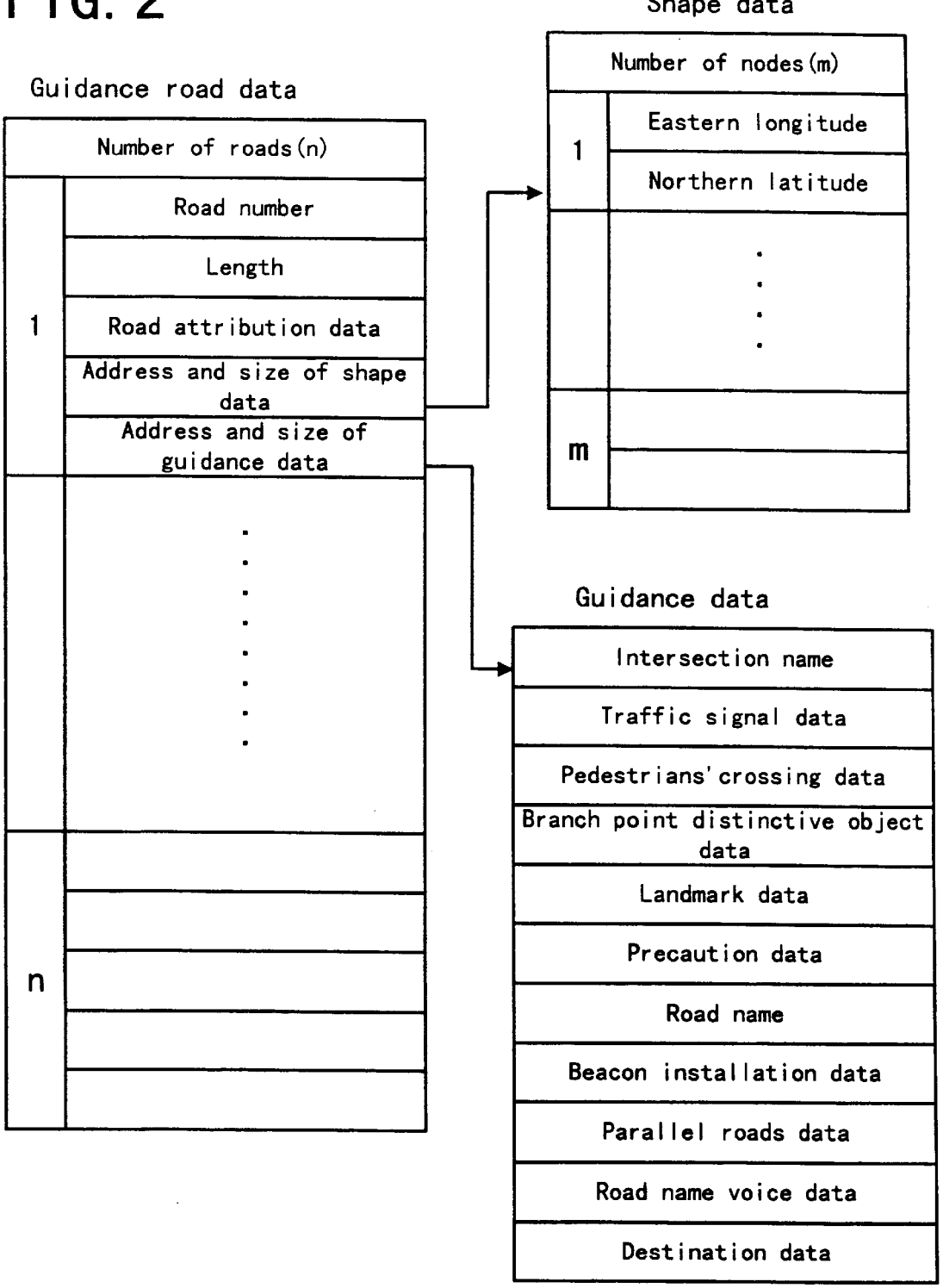
FIG. 2 is a diagram showing an example of the structure of the guidance road data file stored in an information memory device.

FIG. 1 shows an embodiment of a vehicle navigation system according to the invention, FIG. 2 shows an embodiment of the structure of a guidance road data file stored in an information recording device, and FIG. 3 shows the structure of intersection data.

A vehicle navigation system according to the invention comprises an input/output unit 1 for inputting/outputting information relating to route guidance, and selection and execution of various functions; a present position detection device (present position detection means) 2 for detecting information relating to the present position of a vehicle; an information memory device (information recording means) 3 in which navigation data necessary for route calculation, and visual/audio guidance data necessary for route guidance and programs (application and/or OS), etc. have been stored, and a central processing unit 4 for executing audio/visual guidance processing necessary for route search processing and route guidance, and control of the overall system. The following is a description of the respective structures.

The input/output unit 1 functions to enter destinations, to allow the driver to instruct the central processing unit 4, at the volition of the driver, to execute navigation processing in such a manner that guidance information can be outputted by voice and/or a screen display when required by the driver, and to print out processed data. As means for implementing these functions, the input section of the input/output unit 1 has a touch switch device 11 having a plurality of operational touch switches for entering a destination in the form of a telephone number or coordinates on a map, and for requesting route guidance. It is also possible to use a remote controller or other similar input device as an alternative to the touch switch device 11 or use them together, as a matter of course. Other input devices could be used, such as a light wand, a keyboard, or a joystick. Further said input section comprises a video camera 15 for recording scenery in the forward direction of the vehicle. The output section has a display (display output means) 12 for displaying input data on a screen and for automatically displaying route guidance on the screen in response to a request from the driver, a printer 13 for printing out data processed by the central processing unit 4 and data stored in the information memory device 3, and a speaker (audio output means) 16 for outputting route guidance by voice.

It is possible to add a voice recognition unit for enabling voice input and/or a record card reader for reading data recorded on an IC card or a magnetic card. It is also possible to add a data communication device for exchanging data between information sources, such as a personal computer, in which the driver's own data, e.g. map data, destination data, etc., has previously been stored.

The display 12 comprises a color CRT or color liquid-crystal display device. On the basis of map data and guidance data processed by the central processing unit 4, the display 12 outputs, as a color display, all screens necessary for navigation, such as a route setting screen, a screen of an interval view and a screen of intersections. The display 12 also displays buttons for setting route guidance, changing over guidance screens during the route instruction, and invoking selection menus of various functions. In particular, transit-intersection information, such as the names of the intersections to be traversed, is displayed in color in the form of a pop-up menu on the interval view screen when required.

The display 12 is provided inside the instrument panel in the vicinity of the driver's seat. Observing the displayed map enables the driver to ascertain the present location of the vehicle and to obtain information regarding a route from the present location. Further, the display 12 is provided with the touch switches 11 that correspond to the display of function buttons. The operations described above are executed based upon signals entered by touching the displayed buttons. Input signal generating means comprised of the buttons and touch switch provides the input section, though a detailed description thereof is omitted.

The present position detection device, or means, 2 detects or receives information on the present position of the vehicle. The present position detection means 2 comprises an absolute directional sensor 24, such as a geomagnetic sensor; a relative directional sensor 25, such as a steering sensor, or a gyro sensor; a velocity sensor 26 that detects vehicle speed (or traveling distance) from the number of revolutions of a wheel; a GPS receiver 21 which uses the Global Positioning System (GPS), and communication device. The communication device comprises a VICS information receiver 22, which is a traffic information receiving means, and a data transceiver 23. The VICS (Vehicle Information & Communication System) transmits traffic information to the vehicle in real time using, for example, FM multiplex signal (multiplexed text broadcasting), radio beacon, and optical beacon. The FM multiplex signal transmits rough information over a wide area. The radio beacon and optical beacon transmit detailed information in a narrow area of approximately 10-km radius from the beacons and the vehicle receives the information while passing by the beacon. VICS transmission data includes the degree of traffic congestion (e.g. no passage, congested, crowded, dense traffic, regular traffic), the front position of traffic congestion, the length of traffic congestion, traffic control (road construction information, no passage, etc.), and the length of travel time (required time at the predetermined speed) corresponding to the link numbers of the respective roads. Further, data transceiver 23, such as a cellular phone and a personal computer, communicates information required for navigation guidance bi-directionally with the traffic information center (e.g. ATIS) when required by a driver.

The information memory device 3 is an external storage device storing the navigation program and data in an external storage medium, such as a CD ROM (hereinafter referred to as CD), a DVD (Digital Video Disc), a ROM, an optical CD, an IC Card, etc. The navigation program comprises a map drawing section, a route search section, a route guidance section, a present position calculation section, and a destination setting operation control section at least. Other sections as necessary may be part of the navigation program. Further the program comprises an application section and an OS section for executing signal processing of the navigation system in which the program for processing route search, the display output control required for route display guidance, the program for executing audio output control necessary for audio guidance and data required for the program, and also display information data necessary for route guidance and map display. The data contains the record of all data necessary for the navigation system, such as map data, intersection data, road data, and various guidance data.

A program for setting a destination and a passing point on the basis of position information from a present position detection device 2 and inputting signals from an input device 11 (route search means), and performing a route search by using search road data, a program for executing route search again by converting search road data on the basis of traffic information obtained from the communication device, a program (route information conversion means) for converting the searched route so that searched route can be displayed in the form of 3D images, a program for determining audio output timing and audio phrases pursuant to the map drawing, matching a route, and a program for identifying characteristics from images captured through a video camera 15 which is an image photographing means, determining relative moving direction of an identified characteristics on the display, and determining a travel route based on the moving direction. The respective functions of the navigation system according to the invention are performed by activating the programs stored in the information memory device 3. In the embodiment of the invention, the programs for performing the functions of the invention are stored in the information memory device 3, which is an external recording medium.

All the programs or a part of the programs, and all the data or a part of the data for performing the functions of the invention can be received through the data transceiver 23 from the information center, or other vehicles, and stored in a flash memory 41 or ROM 42 which can be the recording medium of the system.

The central processing unit 4 comprises a CPU 40 for performing various calculation processing, a flash memory 41 for reading and storing a program from a CD installed in the information memory device 3. The flash memory 41 can be rewritten by erasing the stored program when a program stored in a CD is changed. The central processing unit 4 comprises a first ROM 43*a* storing a program (program reading means) which executes program check and update processing of a flash memory 41, RAM 42 temporarily storing a searched route guidance information, such as position coordinates of a set destination, road code number, etc. and data under calculation processing, and a second ROM 43*b* storing display information data required for route guidance and map display. The program for performing update processing can be stored in a external storage device.

Further the central processing unit 4 comprises an image memory 44 in which image data to display on the screen is stored; an image processor 45 which, on the basis of a display control signal from the CPU 40, extracts image data from the image memory 44 and delivers the data to the display unit following image processing; an audio processor 46 which, on the basis of an audio-output control signal from the CPU 40, combines audio, phrases, single sentences and sounds, etc. read out of the RAM 42 and converts the result to an analog signal and delivers the analog signal to the speaker 16; a communication interface 47 for performing an exchange of input/output data by communicating device; a sensor-input interface 48 for accepting a sensor signal from the present-position detection device 2; and a clock 49 for entering date and time into the internal dialog information.

A photographed image is converted from analog signals to digital signals through CPU 40, and recorded into RAM 42. From this image data, landmarks, such as intersections and turning points, are identified and image identification processing is executed. In the image identification processing, landmarks are identified by referring to an image data file color and feature information stored in information memory device 3.

In the Central Processing Unit 4, CPU 40 adopts data obtained from respective sensors of the present position detection device 2 through sensor input interface 48, and calculates a present position coordinate at established periods and temporarily stores the coordinate in RAM 42. The present position coordinate results from map matching in consideration of detection error of various data. Correction of an output value from various sensors is constantly performed. Route guidance is performed through both screen display and audio output and a driver can select route navigation with or without audio output.

A program required for route navigation can be stored in advance in ROM 43*a* of the central processing unit 4 or in information memory device (recording medium) 3. In the case where the program is stored in information memory device 3, the program is renewed and the renewed program is executed by replacing information memory device 3 when the system reads a program from information memory device 3 and stores the read program in a flash memory 41. The navigation system can be performed by temporarily storing the read program from information memory device 3 into the RAM 42.

A guidance (search) road data file stored in information memory device 3 is necessary for calculating a route by a route search section and for performing route guidance. FIG. 2 shows some of the data. The guidance (search) road data file comprises road number, length of a road, road attribution data, address and size of shape data, and address and size of guidance data for each road number n. Each road between branch points, such as intersections, is assigned a road number as an identification number by the lane direction. Road attribute data describes road classification, such as an overpass, an underground, a highway, a national road, an ordinary road, a toll road, etc. Shape data, which describes the road shape, when roads are divided by a plurality of nodes, has coordinate and direction data comprising the appropriate latitude and longitude data based on where the system is used (east latitude and north longitude in Japan; west latitude and north longitude in the U.S.) which corresponds to node number m. Guidance data comprises data, such as the name of an intersection (branch point), precaution data, the presence or absence of traffic lights, the presence or absence of sidewalks, intersection characteristics and landmarks (traffic signs, signboards for gas stations and convenience stores), precaution points (information on railroad crossings, tunnel entrances, tunnel exits, width reduction points), road names (road classification information, such as national highways, common roads (national road, prefectural road, and others)), beacon installation (beacon type and beacon installation based on node or coordinate), parallel roads (presence or absence, type), features (left side position of the overpass about underpass data), road name voice, and data of each destination. Road data includes information on intersections. As shown in FIG. 3, information on the presence or absence of traffic lights and the roads to be connected can be stored as intersection data by separating it from road data. When road information includes connection data, data, such as access from one road to another is prohibited, can be stored easier and the data quantity is decreased.

Figure 4:
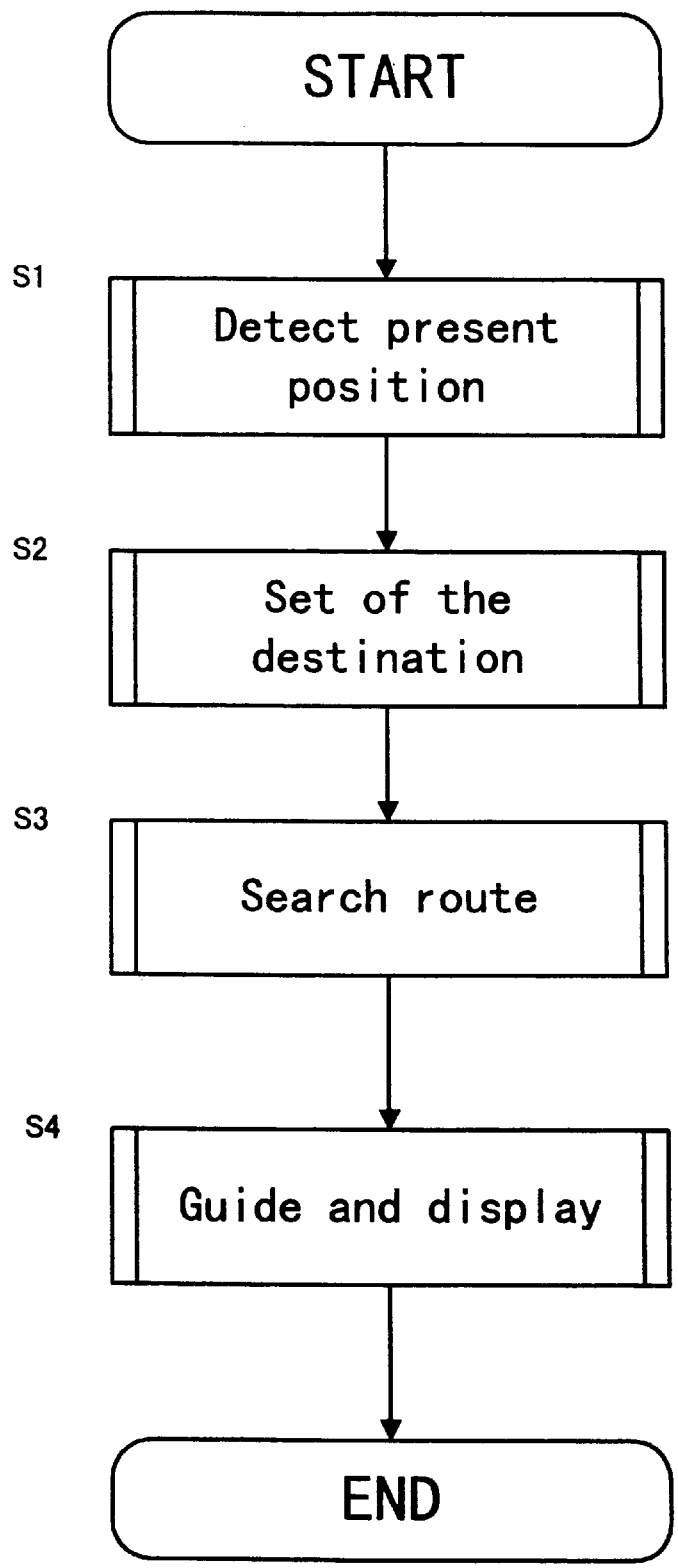
FIG. 4 is a flowchart showing the processing flow of the overall system according to the invention.

FIG. 4 is a flow chart describing the process of the overall navigation system according to the invention. As initialization processing, a navigation program is read from a CD-ROM by the CPU 40, comprising a central processing unit 4, and when the program is stored in a flash memory 41 and activated, the navigation system detects a present position by using the present position detection device 2, as shown in FIG. 1, displays the appropriate map, which area extends from the present position to its periphery, on the screen, and displays the name of the present position, etc.(step S1). Next, the navigation system sets a destination by using, for example, a telephone number, an address, a facility name, and/or a registered location, (Step S2), and executes a route search from the present position to the destination (Step S3). As a result of the route search, the route to the destination is set as guidance road number data which is arranged numerically. When the route is determined, the navigation system repeatedly performs display and audio output of route guidance until the vehicle reaches the destination by keeping track of the present position using the present position detection device 2 (step S4).

When the system according to the invention detects a present position to perform and display the executed route guidance, in the above identified step S4, and executes matching processing on the basis of guidance road data stored in the information memory device 3, the system can perform precise matching on the parallel roads and identify the present position by determining whether parallel roads, i.e., multilevel roads, exist on the basis of guidance road data and controlling, i.e. increasing and decreasing, matching cost for road characteristics by executing decision processing of the parallel roads when the parallel roads exist. Further the present system determines vehicle position, on one of the parallel roads, in accordance with the respective road travel information. The following is a description of decision processing of parallel roads.

Figure 5:
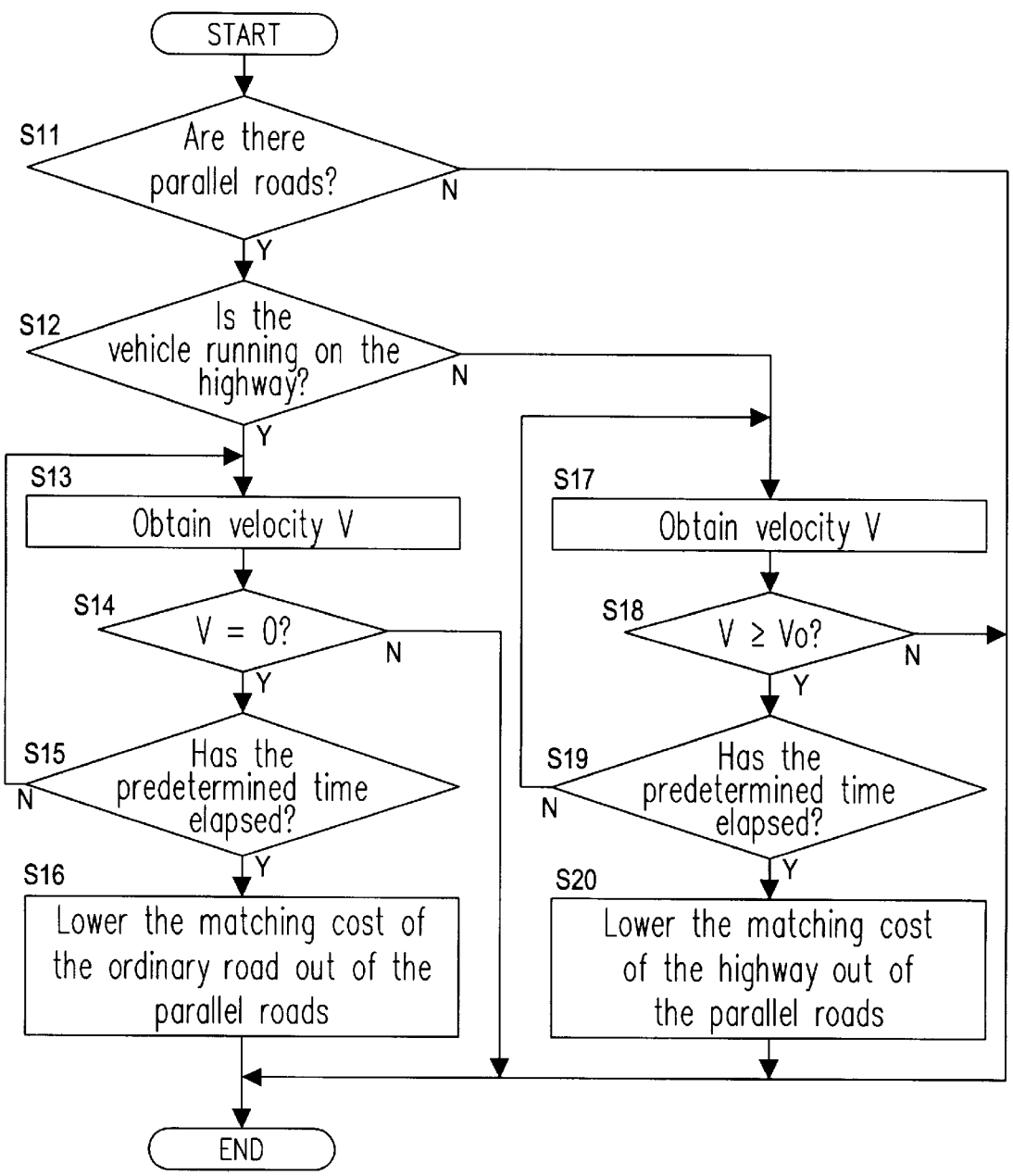
FIG. 5 is a flowchart showing an example of the parallel road deciding processing on the basis of vehicle speed and time.
Figure 6:
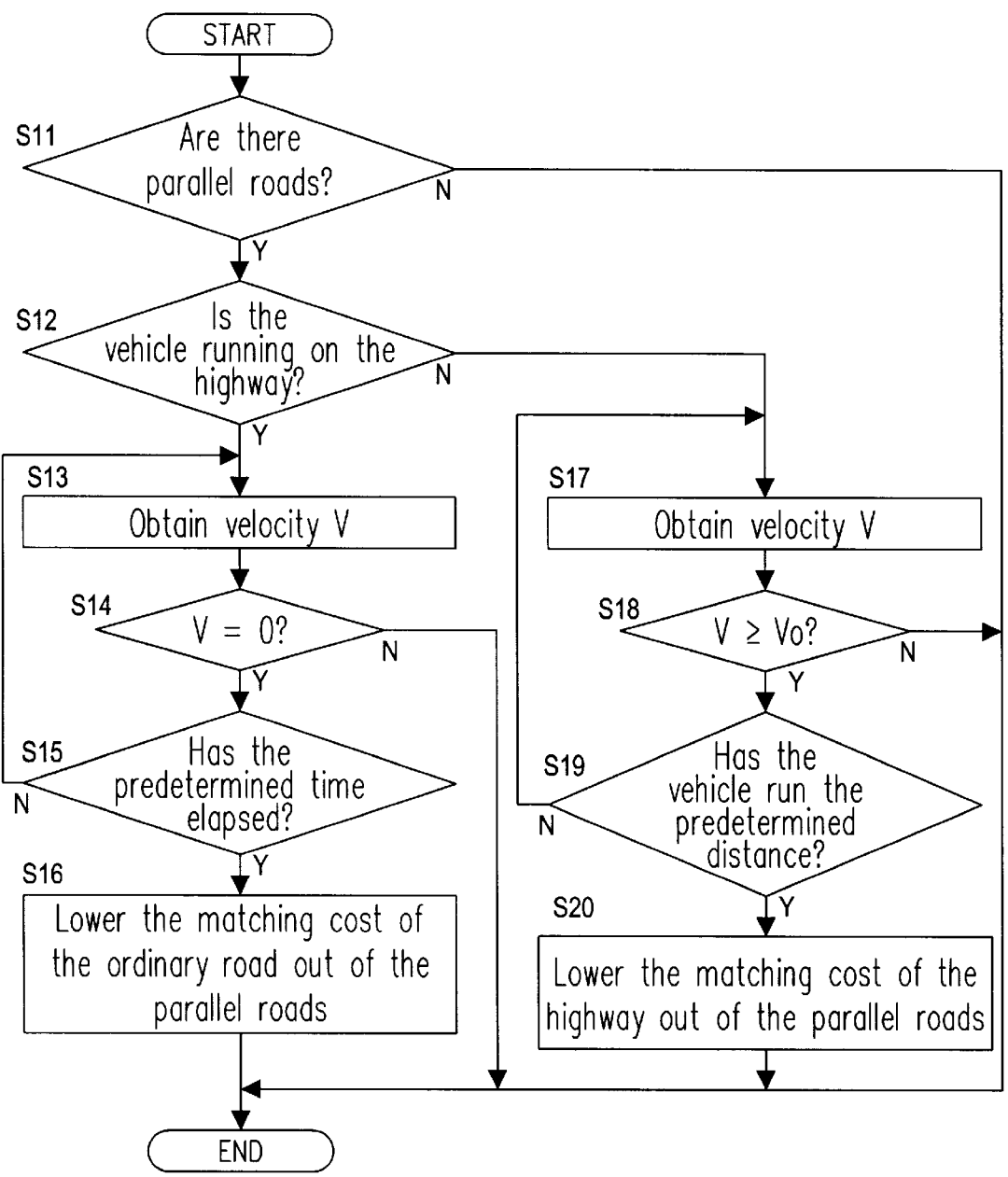
FIG. 6 is a flowchart showing an example of the parallel road deciding processing on the basis of vehicle speed and distance.

FIG. 5 describes an example of decision processing of parallel roads based on vehicle velocity and time; FIG. 6 describes an example of decision processing of parallel roads based on vehicle velocity and distance; and FIG. 7 describes an example of decision processing of parallel roads based on vehicle velocity and the presence or absence of an intersection.

As shown in FIG. 5, during decision processing of parallel roads, when the system detects the present position, the system determines whether parallel roads exist (step S11), when the parallel roads exist, the system then determines whether the road performed matching as the road on which vehicle is running is the highway (overpass)(S12), and when the vehicle is running on the highway (overpass), obtains vehicle velocity V (S13) to determine whether the velocity V is 0 (S14). When the velocity is not 0, the system ends processing. When the velocity is 0, the system is put on hold during a predetermine period of time (such as a red light period) (S15). Then, as the system confirms that the vehicle is stopped, the matching cost of the ordinary road is reduced (S16), and the processing is complete. This means that the possibility that the vehicle is running on the ordinary road is higher when the vehicle is stopped during more than the predetermine period of time.

The following is the description of the control of matching cost. The system determines the possible road on which the vehicle is running and the present position on the road on the basis of the information on the present position (estimated present position) obtained from various sensors of the present position detection device 2. Then the system calculates the correlation between the estimated present position and the possible roads and the positions on which the vehicle is running, and between the travel trace of the estimated present position and the travel traces of the possible roads on which the vehicle is running, and selects the road which is the most likely (e.g. Japanese Patent Publication No. 147906/94 and No. 11424/95). Matching cost shows the calculated correlation values of the respective choices. According to the present embodiment, the road having lower matching cost is regarded as the possible road on which the vehicle is running. However, the calculation method of matching processing and method of determining the road and position are varied. Therefore, the present invention adopts all the processing which makes it easier to select one of the parallel roads through matching processing, and is not limited to the described method.

When the system determines the vehicle is not running on the highway through step S12 (as discussed above with respect to FIG. 5), the system obtains the vehicle velocity V (step S17), and determines whether the obtained velocity V is more than the predetermined value $V_0$ (step S18). When the velocity V is less than the predetermined value $V_0$, the processing is complete, and when the velocity V is more than the predetermined value $V_0$, the system is put on hold during a predetermined period of time (derived to indicate sustained travel speed) (step S19). Since step S19 determines that the vehicle is running not on an ordinary road but on a highway of the parallel roads, the system decreases the matching cost of the highway (step S20), and ends the processing.

The processing is determined by the running duration under certain conditions. As shown in FIG. 6, when the system determines the vehicle is not running on the highway (step S12), that is, when the vehicle is running on the ordinary road with a velocity V which is more than the predetermined velocity value $V_0$ (step S18) during a predetermined distance (indicating sustained travel) (step S19), the system determines that the vehicle is probably not really running on the ordinary road but is running on the highway of the parallel roads. The matching cost of the highway is reduced.

Figure 7:
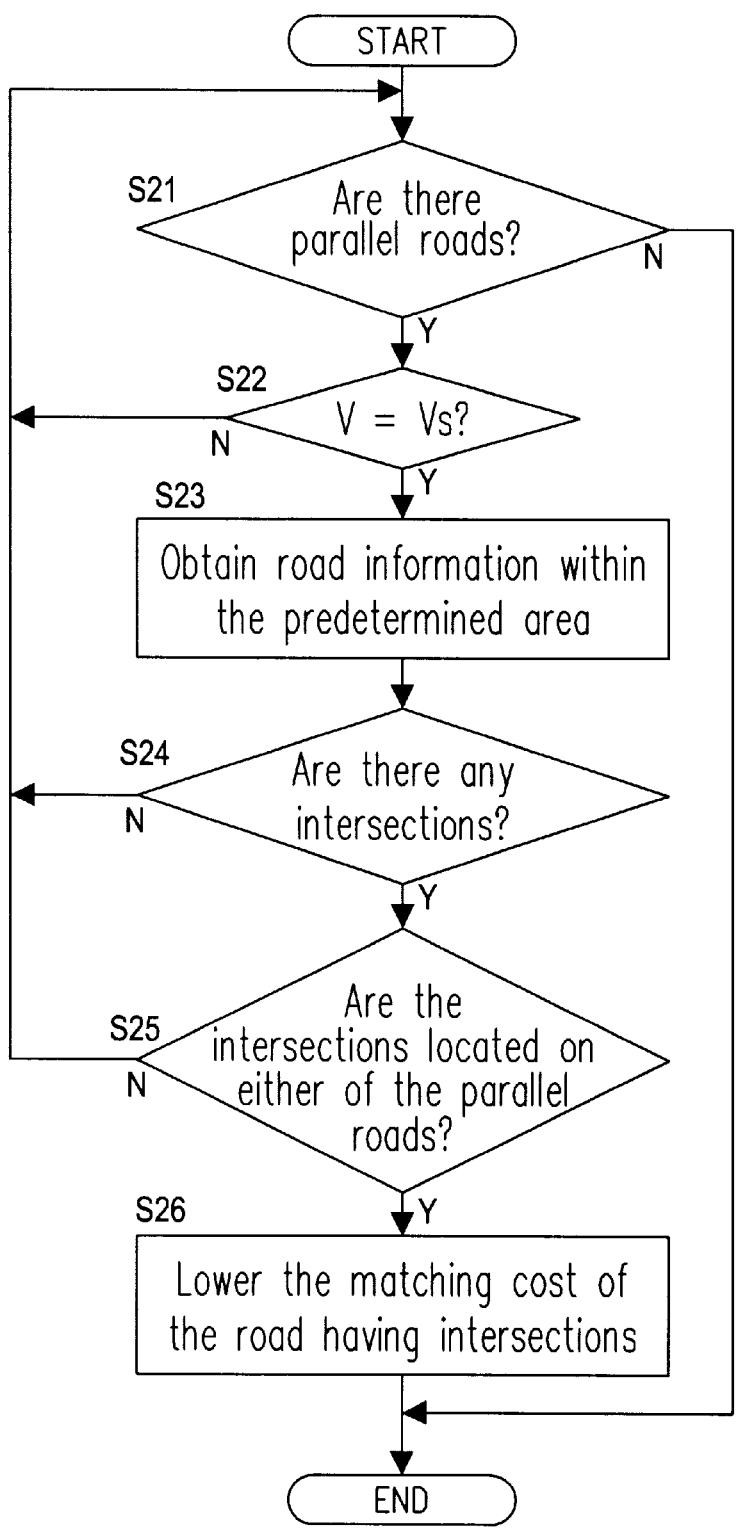
FIG. 7 is a flowchart showing an example of the parallel road deciding processing on the basis of the vehicle speed and information whether intersections exist on the road.

The aforementioned processing shown in FIGS. 5 and 6 controls matching cost of one of the parallel roads based on the velocity and under the condition maintained within the predetermined range of the velocity. Further, the system may control matching cost based on the information of whether intersections exist when the vehicle is stopped. In this case, as shown in FIG. 7, the system determines whether any parallel roads exist (step S21). When parallel roads exist, the system obtains velocity V and determines whether velocity V is less than or equal to velocity $V_S$ (step S22). The system then obtains road information on both of the parallel roads within a predetermined distance from the estimated present position when velocity V is less than or equal to $V_S$ (step S23). Then the system determines whether intersections exist on the basis of the road data (step S24) and, when intersections exist, determines on which road the intersections exist (step S25), and reduces matching cost of the road on which the intersections exist (step S26).

Figure 8:
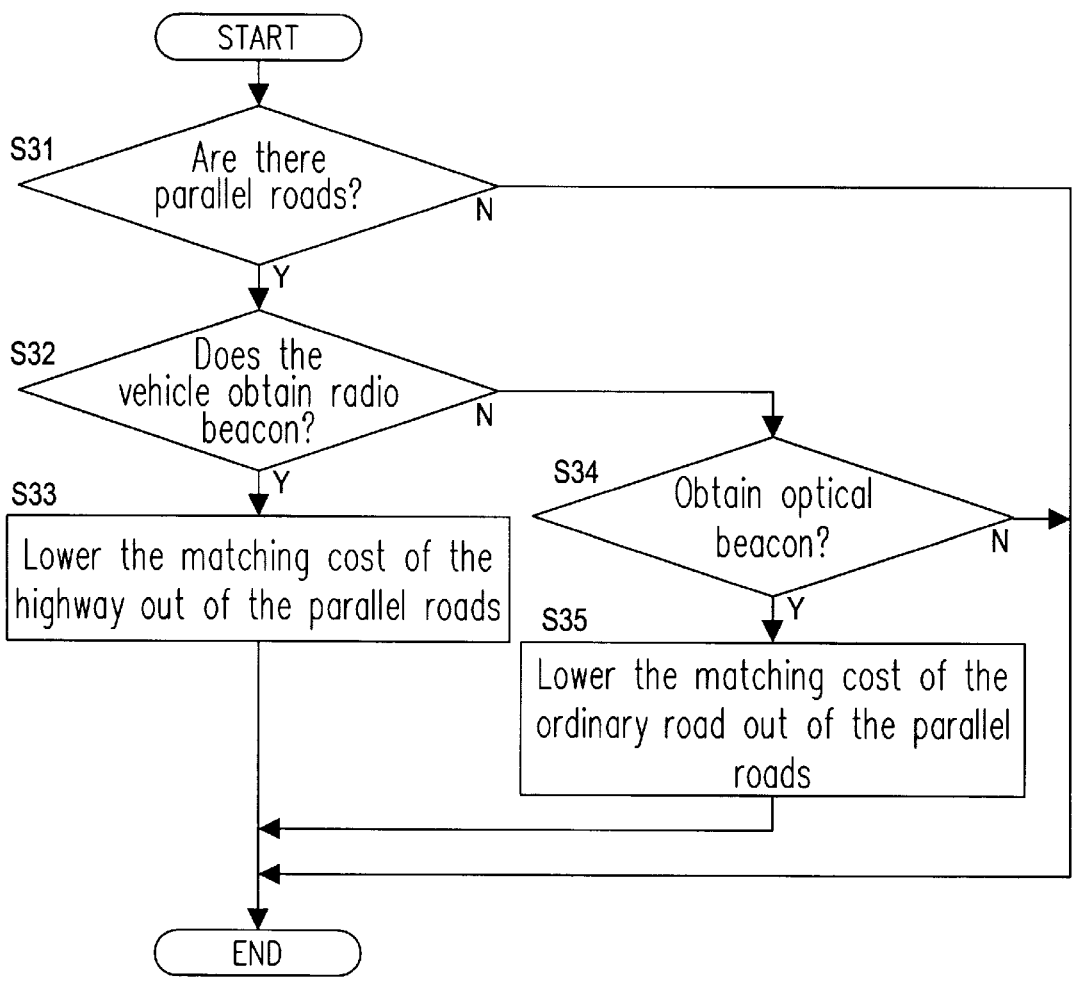
FIG. 8 is a flowchart showing an example of the parallel road deciding processing on the basis of the kind of beacon installation information.
Figure 9:
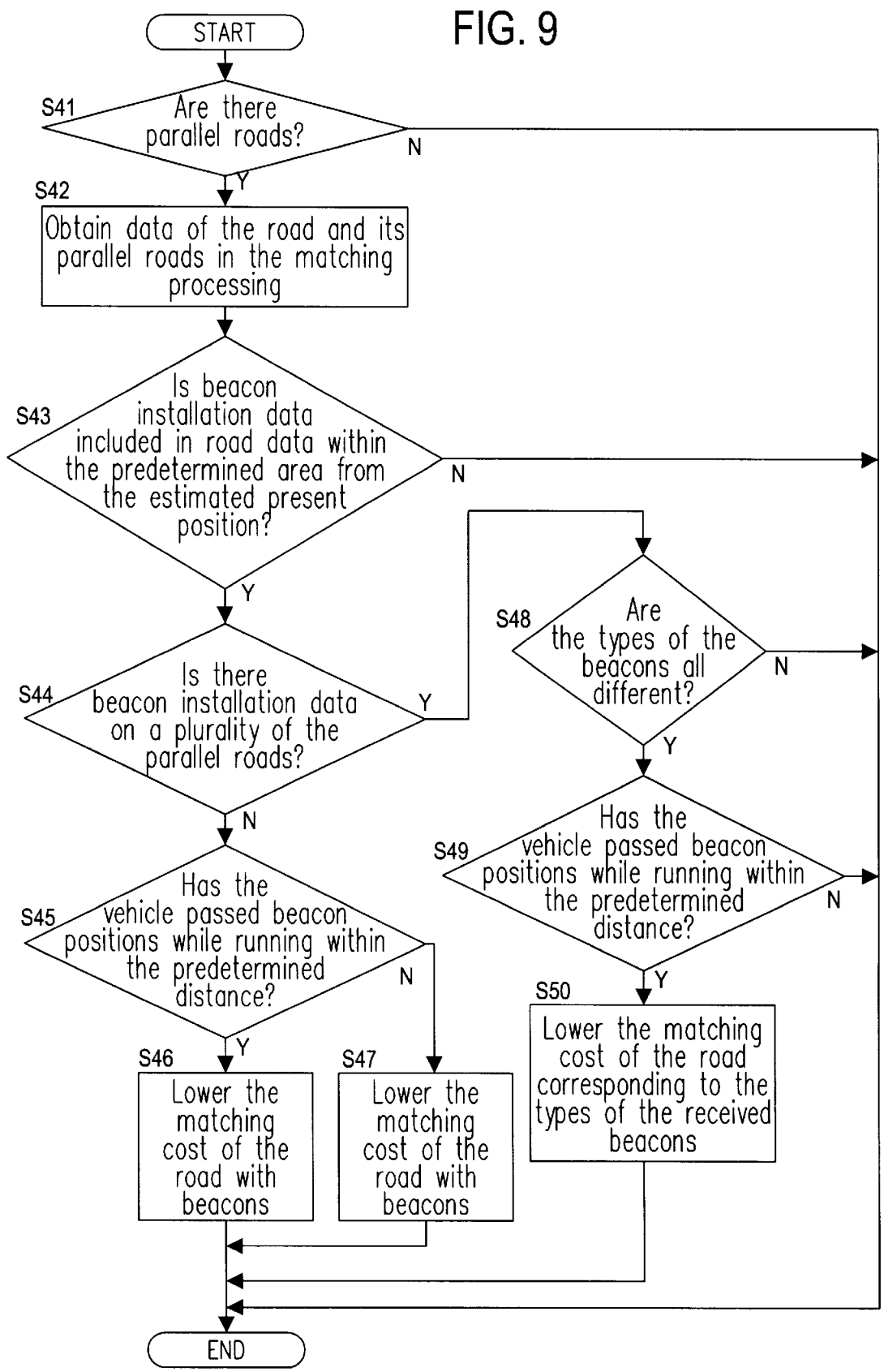
FIG. 9 is a flowchart showing an example of the parallel road deciding processing on the basis of the location and the type of the beacon of beacon installation information.

FIG. 8 describes an example of executing decision processing for the parallel roads based on the type of beacons in the beacon installation information. FIG. 9 describes an example of executing decision processing for the parallel roads based on the position and the type of beacons in the beacon installation information.

The system executes decision processing for the parallel roads on the basis of the velocity and the continuation of the velocity within the predetermined time and distance and the presence or absence of intersections. Further, the system may determine the road on which the vehicle is running from the parallel roads using the beacon installation information regardless of velocity and control matching cost. The system determines that the present road is mistakenly identified by storing beacon installation positions in a map database, when the system doesn't obtain various data such as position information and traffic information, etc. from the beacon passed by the vehicle upon present position detection. Such determination can be used for amending the calculation of the matching correlation. That is, instead of moving to the other road, matching precision can be improved by amending the road cost obtained by the correlation calculation. Therefore the system can search alternative roads for executing matching processing by controlling the matching cost.

As a result, the matching road is altered to the road of the higher possibility second to the present road.

When the system determines the parallel roads by using a beacon, as shown in FIG. 8, the system determines whether parallel roads exist (step S35), when parallel roads exist, the system determines whether a radio beacon is obtained (step S32) or optical beacon is obtained (step S33) based on the signals received by a VICS receiver. As a result of the determination, when the system obtains radio beacon, matching cost of a highway of the parallel roads is reduced (step S33) and when the system obtains an optical beacon, matching cost of an ordinary road is reduced (step S35).

As an alternative, when parallel roads are determined using the beacon installation information, as shown in FIG. 9, the system determines whether parallel roads exist (step S41), and when parallel roads exist, road data of the road for which matching is being performed and its parallel roads is obtained (step S42). The system then determines whether beacon installation data is included in road data within the predetermined range from the estimated present position (step S43). When beacon installation data is obtained, the system determines whether beacon installation information on the plurality of the parallel roads is also obtainable (step S44).

In view of the fact that various kinds of beacons are installed corresponding to the types of the roads, as shown in FIG. 2, beacon installation information comprising the locations and the types of beacons is stored in a database. The system searches for beacon installation data and determines whether beacon installation data exists on a plurality of the parallel roads. When beacon installation data exists on only one road, matching cost of either the road with beacon or the road without beacon is reduced based on whether the vehicle passes the beacon installation location during traveling (steps S45, S46). However, when beacon installation data exists on a plurality of the parallel roads, under conditions where the types of beacons are different (step S48) and the vehicle passes a beacon installation location during traveling within the predetermined distance (step S49), the matching cost of the road corresponding to the type of beacon passed, based on the data received, is reduced (step S50). In this case, it is obvious that the system can not specify one of the parallel roads when beacon installation data is not obtainable, a plurality of beacon installation data are obtainable and the types of beacons are the same, or the types of beacons are different and the system can't determine whether the vehicle passes the beacon installation location. Further, in case where the system can receive data through data transceiver/receiver and information which can specify one of the parallel roads is available, one may use that information.

Figure 10A:
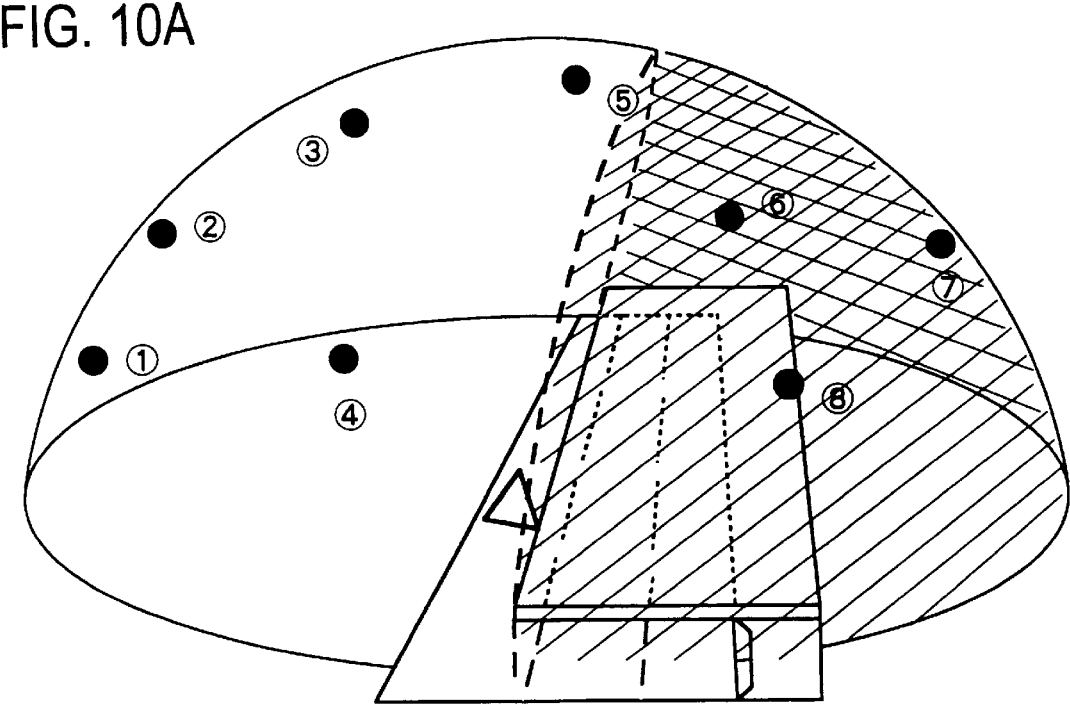
FIGS. 10A and 10B are diagrams for describing the area in which the system can receive GPS satellite signals when one of the parallel roads is an overpass and the other is an underpass.
Figure 10B:
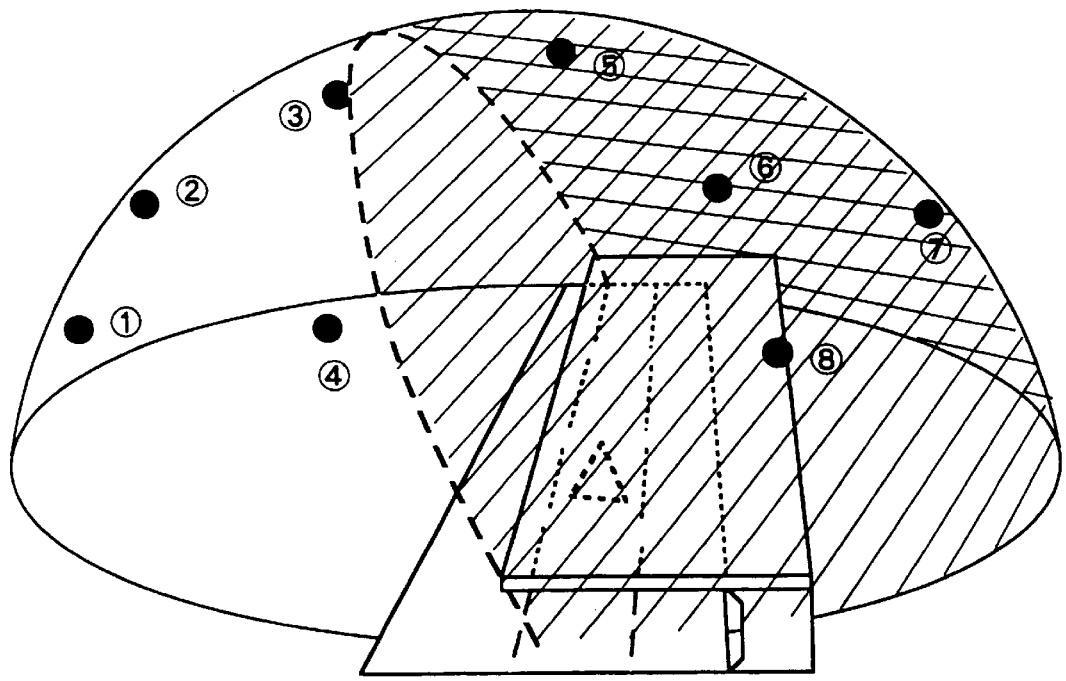
Figure 11:
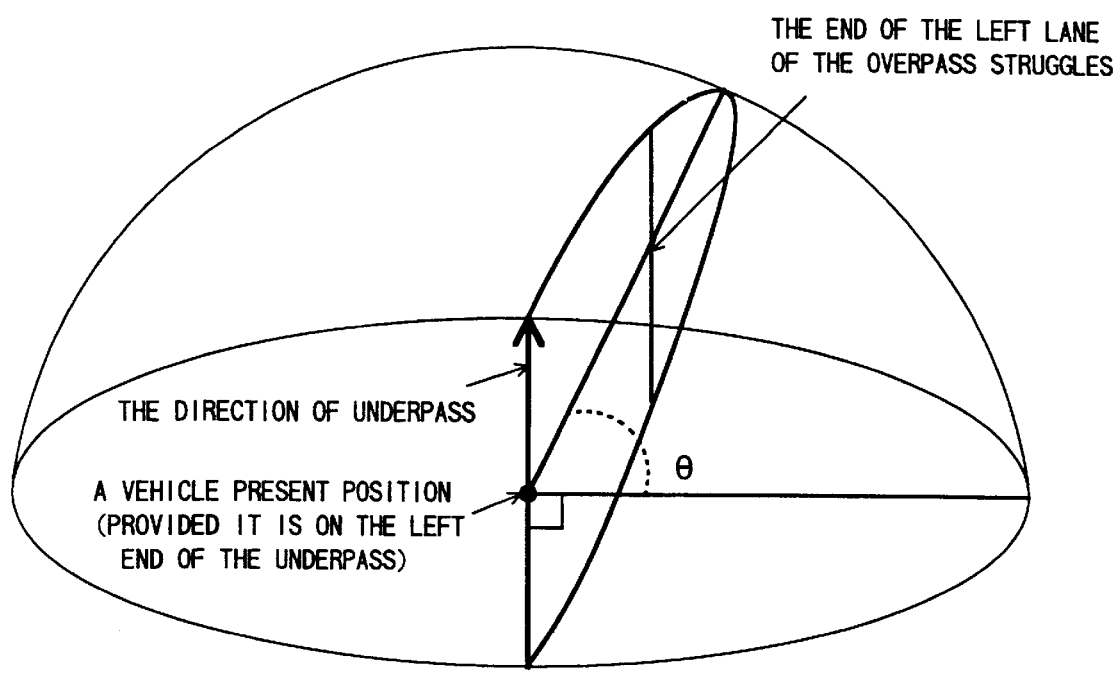
FIG. 11 is a diagram for describing the area in which the system can receive satellite signals regarding the overpass side and the travel position.
Figure 12:
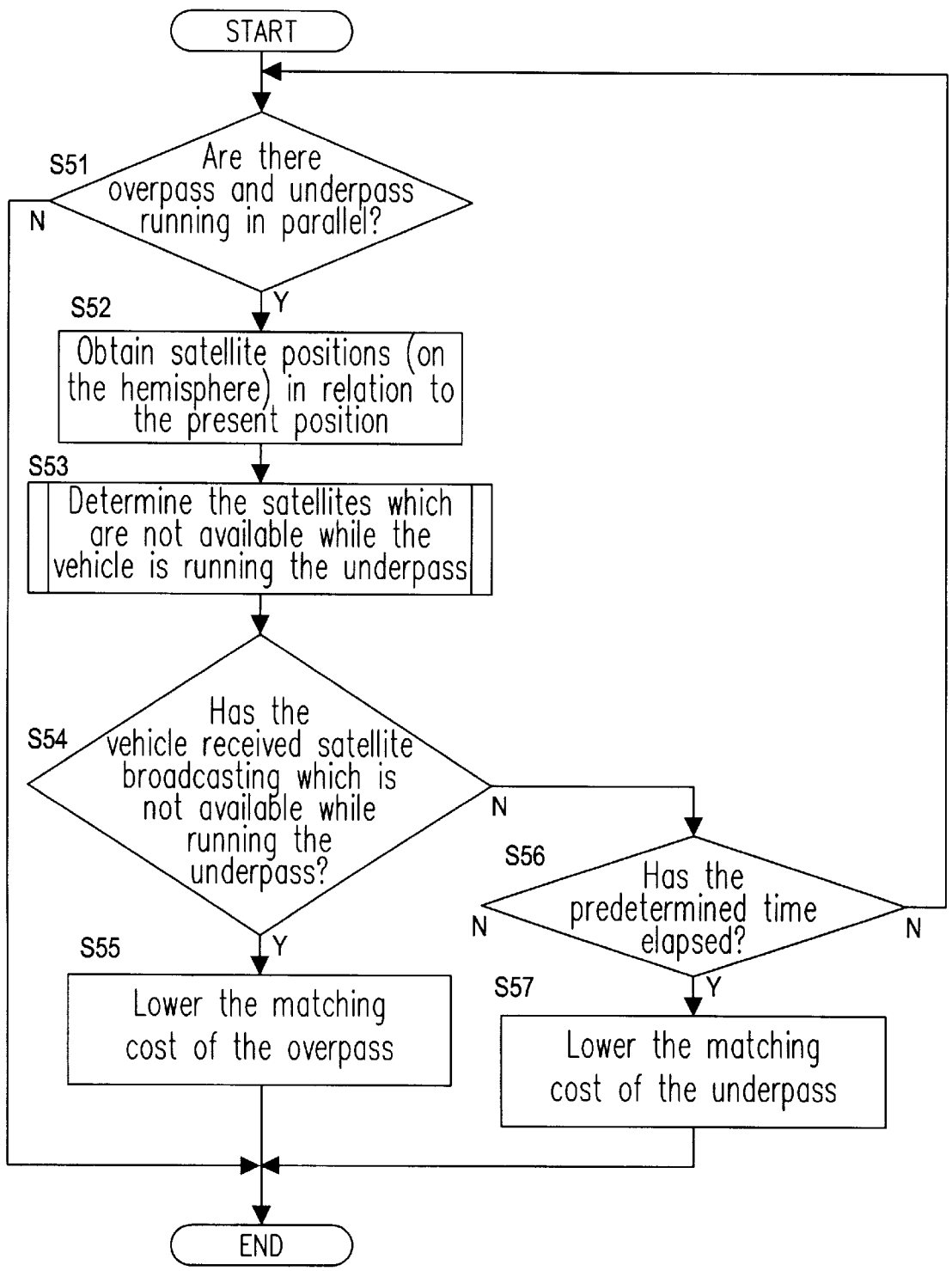
FIG. 12 is a flowchart showing an example of the parallel road deciding processing depending on the GPS signal receiving condition.

FIGS. 10A and B show the range in which GPS satellite's signals can be received when one of the parallel roads is an overpass and the other is an underpass. FIG. 11 shows the range in which the satellite's signals can be received. FIG. 12 is an example flowchart of performing decision processing for the parallel roads based on the reception of a GPS receiver.

As vehicle travel information, the system can use information from the GPS satellites as well as the mentioned velocity and beacon. When there are no obstacles over the running vehicle, the vehicle travel information can be received by GPS receiver 21 through various satellites with different directions and angles. However, as shown in FIGS. 10A and B, in the case where an overpass is running over an underpass in parallel, when the vehicle is running in the underpass, GPS signals from the satellites with the directions and angles which belong to the shaded area are screened by the overpass and cannot be received. Therefore, when the vehicle drives on the left-hand side of the road and the overpass runs over the upper right-hand side of the road on which the vehicle is running, as shown in FIG. 11, for example, the system may calculate the angle θ defined by the intersection of the surface containing the underpass and a plane extending from the left-hand side, or edge, of the overpass to the left-hand side, or edge of the underpass where the vehicle is running, and determine the parallel road in the area where the GPS signals are obtained or the area where the GPS signals are not obtained, based on the angle θ. Further the system may determine the lane in which the vehicle is running by beacons and determine the angle θ corresponding to running wheels. This means that the angle θ can be variable depending on the travel conditions.

When the system uses the GPS, for example, as shown in FIG. 12, the system determines whether the overpass and the underpass are running in parallel (step S51), obtains satellite positions (on the hemisphere) corresponding to the present position (step S52), and determines the satellites from which signals can not be received upon traveling (step S53). Then the system determines whether satellite signals, which are not obtainable when the vehicle is running the underpass, are obtainable (step S54). When the system receives the signals, the system determines the vehicle is running the overpass. Therefore the system reduces the matching cost of the overpass (step S55). When the system doesn't receive the satellite signals which are not obtainable when the vehicle is running the underpass (step S56), the system determines the vehicle is running the underpass. Then the system reduces the matching cost of the underpass (step S57). When the number of the satellites from which data is obtainable is asymmetrical in both sides of the road to the direction in which the vehicle is headed and differs in the respective parallel road, such information can also be used for processing.

The invention is not limited to the above embodiments. Various changes are possible. For example, in the above mentioned embodiments, velocity and the duration of time that the velocity is maintained, and signals from a beacon or GPS are detected as vehicle travel information and used to determine the road travelled from parallel roads. It is a matter of course that the methods can be used in combination. In short, the invention determines the roads, when there exist the parallel roads, based on the vehicle travel information and the reception of signals, determines the estimated present position, and amends the display of the present position mark and travel path.

As is clear from the above explanation, the system according to the invention determines the roads travelled based on the vehicle travel information and the reception of signals when there exists parallel roads. This enables the system to provide appropriate route guidance by performing more accurate matching processing and detection of the present position. Further, since the system determines the road travelled based on beacon information from beacon installation data and also based on travel information, such as parallel road data, this enables the system to determine the road based on more precise information.

Because the system controls matching cost and executes matching processing based on the vehicle travel information and the reception of signals, the system is able to execute multi-matching processing by using the parameters of various matching costs.

What is claimed is:

1. A vehicle navigation system executing matching processing of present position detection information to road information and providing route guidance, comprising:
   information memory means for storing road information for parallel roads and other information required for executing route guidance;
   present position detection means for detecting a present position by detecting vehicle travel information; and
   control means for reading road information stored in said information memory means on the basis of the present position detected by said present position detection means, executing matching processing of the present position detection information to said road information, and providing route guidance, wherein said control means determines the road on which the vehicle is running from the parallel roads by determining whether intersections exist in the vicinity of the present position on the basis of road information stored in said information memory means, when the system determines the vehicle is stopped based on the velocity of the vehicle detected by said present position detection means.

2. A vehicle navigation system executing matching processing of present position detection information to road information and providing route guidance, comprising:
   information memory means for storing road information for parallel roads and other information required for executing route guidance;
   present position detection means for detecting a present position by detecting vehicle travel information; and
   control means for reading road information stored in said information memory means on the basis of the present position detected by said present position detection means, executing matching processing of the present position detection information to said road information, and providing route guidance, wherein said control means determines the road on which the vehicle is running from the parallel roads by determining the types of beacons detected by said present position detection means.

3. The vehicle navigation system according to claim 2, wherein said control means determines the road on which the vehicle is running from the parallel roads by obtaining beacon installation information on the respective parallel roads from the road information stored in said information memory means, and determining whether the vehicle passes by the beacons on the road and a type of the beacons passed.

4. A vehicle navigation system executing matching processing of detection information of a vehicle present position to road information and providing route guidance, comprising:
   information memory means for storing road information for parallel roads and other information required for executing route guidance;
   present position detection means for detecting a present position by detecting vehicle travel information; and
   control means for reading road information stored in said information memory means on the basis of the present position detected by said present position detection means, executing matching processing of the present position detection information to said road information, and providing route guidance, wherein said control means determines the road on which the vehicle is running from the parallel roads by determining the angle of the satellite signals detected by said present position detection means.

5. A vehicle navigation system executing matching processing of detection information of a vehicle present position to road information and providing route guidance, comprising:
   information memory means for storing road information for parallel roads and other information required for executing route guidance;
   present position detection means for detecting a present position by detecting vehicle travel information; and
   control means for reading road information stored in said information memory means on the basis of the present position detected by said present position detection means, executing matching processing of the present position detection information to said road information, and providing route guidance, wherein said control means determines whether the parallel roads exist on the basis of the road information stored in said information memory means, and when parallel roads exist, determines the road on which the vehicle is running by selecting one of said parallel roads according to said road information of said parallel roads, under the condition the velocity detected by said present position detection means continues for one of a predetermined distance and a predetermined time, controlling matching cost, and executing matching processing.

6. A recording medium, for a vehicle navigation system which executes matching processing of present position detection information to road information and provides route guidance, comprising:
   storing road information for parallel roads and other information required for executing route guidance;
   a routine for detecting the present position by detecting vehicle travel information; and
   a control routine for reading the stored road information on the basis of the present position detected by the routine for detecting the present position and executing matching processing of the present position to the road information to provide route guidance, wherein the control routine further determines one of the parallel roads as the road on which the vehicle is travelling using the stored road information identifying whether intersections exist whether the vehicle is stopped on a basis of a velocity detected during the routine for detecting the present position.

7. A recording medium, for a vehicle navigation system which executes matching processing of present position detection information to road information and provides route guidance, comprising:
   storing road information for roads running in parallel and other information to include type of beacon along a road required for executing route guidance;
   a routine for detecting a present position of a vehicle by detecting information on vehicle travel to include type of beacon signal received; and
   a control routine for reading the road information stored in the recording medium on the basis of the present position detected by the routine of detecting the present position and executing matching processing of the present position to the road information to provide route guidance, wherein the control routine further determines one of the parallel roads as the road on which the vehicle is traveling using the type of beacon detected during the routine for detecting the present position.

8. A recording medium, for a vehicle navigation system which executes matching processing of present position detection information to road information and provides route guidance, comprising:

storing road information for roads running in parallel and other information required for executing route guidance;

a routine for detecting a present position of a vehicle by detecting information on the vehicle travel and;

a control routine for reading the road information stored in the recording medium on the basis of the present position detected by the routine for detecting the present position and executing matching processing of the present position to the road information to provide route guidance, wherein the control routine determines one of the parallel roads as the road on which the vehicle is travelling by determining an angle of received satellite signals processed by the routine for detecting the present position.

9. A recording medium, for a vehicle navigation system which executes matching processing of present position detection information to road information and provides route guidance, comprising:

storing road information for roads running in parallel and other information required for executing route guidance;

a routine for detecting the present position by detecting information on the running vehicle; and a control routine for reading the road information stored in the recording medium on the basis of the present position detected by the routine of detecting the present position and executing matching processing of the present position to the road information to provide route guidance, wherein the control routine determines whether the parallel roads exist on the basis of the road information and, when parallel roads exist, the control routine determines the road on which the vehicle is travelling by selecting one of the parallel roads according to the road information using a velocity of the vehicle that continues for one of a predetermined distance and a predetermined time.

10. A navigation system for a land vehicle, comprising:

a present position detection device;

a data storage device storing operating programs, descriptive road data, and point identification data;

a user interface providing at least a visual display and a user data input capability; and a central processing unit controlling the navigation system in accordance with the operating programs and data stored in the data storage device and data output from the present position detection device, wherein a present position of the vehicle when traveling on multi-level roads is identified on the basis of at least one of vehicle speed for a predetermined period of time; a predetermined velocity of the vehicle and road intersection data; reception of beacon transmissions; and reception of signals from Global Positioning System satellites.

11. The navigation system according to claim 10, wherein the present position detecting means comprises:

an absolute directional sensor;

a relative directional sensor;

a velocity sensor;

a Global Positioning System sensor;

a road status information receiver; and a data transceiver.

12. The navigation system according to claim 11, wherein the road status information receiver receives both radio and optical signals from radio beacons and optical beacons respectively.

13. The navigation system according to claim 10, wherein, when the multi-level roads comprise different types, a road on which the vehicle is traveling is determined by the central processing unit by the direction of travel and as signing different weights to each road of the multi-level roads according to vehicle speed, beacon reception and type beacon reception and number and designation of satellites received.

14. The navigation system according to claim 13, wherein the central processing unit identifies vehicle travel on an ordinary road when road data indicates multi-level roads and vehicle velocity has been zero for a predetermined time by lowering the weight of the ordinary road.

15. The navigation system according to claim 13, wherein the central processing unit identifies vehicle travel on a highway when road data indicates multi-level roads and vehicle velocity is greater than a predetermined velocity for a predetermined period of time by lowering the weight of the highway.

16. The navigation system according to claim 13, wherein the central processing unit identifies vehicle travel on a road having at least one intersection when vehicle velocity equals a predetermined speed and the road data indicates intersections on a road of the multi-level roads by lowering the weight of the road having the at least one intersection.

17. The navigation system according to claim 13, wherein the central processing unit identifies vehicle travel on a particular road of the multi-level roads based on whether a beacon signal is received and adjusts road weights on a basis of receipt or non-receipt of beacon signals based on beacon data stored in the data storing device.

18. The navigation system according to claim 17, wherein the central processing unit identifies vehicle travel as on a highway when a radio beacon signal is received by lowering the weight of the highway and as on an ordinary road when an optical beacon signal is received by lowering the weight of the ordinary road.

19. The navigation system according to claim 13, wherein the central processing unit identifies vehicle travel on a particular road of the multi-level roads using Global Positioning System satellite signals available at a geographic position of the vehicle based on data stored in the data storage device, and Global Positioning Satellite signals received to adjust weights of the roads of the multi-level roads.

* * * * *